United States Patent

Shah

(10) Patent No.: US 7,094,445 B2
(45) Date of Patent: Aug. 22, 2006

(54) DIMENSIONALLY CONTROLLED PACK ALUMINIDING OF INTERNAL SURFACES OF A HOLLOW ARTICLE

(75) Inventor: Atul Natverlal Shah, Peabody, MA (US)

(73) Assignee: General Electric Company, Schenectady, NY (US)

( * ) Notice: Subject to any disclaimer, the term of this patent is extended or adjusted under 35 U.S.C. 154(b) by 220 days.

(21) Appl. No.: 10/140,852

(22) Filed: May 7, 2002

(65) Prior Publication Data

US 2003/0211242 A1 Nov. 13, 2003

(51) Int. Cl.
- *B05D 7/22* (2006.01)
- *B21D 53/78* (2006.01)
- *B23P 15/02* (2006.01)

(52) U.S. Cl. .............. 427/235; 427/230; 427/239; 427/252; 29/889.721; 416/232; 416/241 R

(58) Field of Classification Search ......... 427/230, 427/232, 234, 235, 239, 252; 29/889.7, 889.71, 29/889.72, 889.721; 416/232, 241 R
See application file for complete search history.

(56) References Cited

U.S. PATENT DOCUMENTS

| | | | |
|---|---|---|---|
| 3,079,276 A | 2/1963 | Puyear et al. | |
| 4,156,042 A | 5/1979 | Hayman et al. | |
| 4,347,267 A | * 8/1982 | Baldi | 427/237 |
| 4,528,215 A | * 7/1985 | Baldi et al. | 427/252 |
| 4,714,624 A | * 12/1987 | Naik | 148/527 |
| 5,215,785 A | * 6/1993 | Strasser et al. | 427/230 |
| 5,441,767 A | * 8/1995 | DeSaulniers | 427/252 |
| 5,807,428 A | * 9/1998 | Bose et al. | 106/14.44 |

FOREIGN PATENT DOCUMENTS

GB    1 497 694    * 1/1978

* cited by examiner

*Primary Examiner*—Timothy Meeks
*Assistant Examiner*—Wesley D. Markham
(74) *Attorney, Agent, or Firm*—McNees Wallace & Nurick LLC

(57) ABSTRACT

An article such as a hollow gas turbine blade has an internal cavity therein with an inlet and outlet. The outlet has an outlet minimum transverse dimension of from about 0.009 inch to about 0.012 inch. An aluminiding source powder has a minimum particle size of greater than about 0.0015 inch and not greater than about 0.005 inch. The aluminiding source powder is a mixture of from about 5 to about 15 percent by weight of a metallic aluminum-containing powder and from about 85 to about 95 percent by weight of a ceramic powder. The aluminiding source powder is flowed into the internal cavity through the inlet, and the article is heated with the aluminiding source powder in the internal cavity to a temperature of from about 1750° F. to about 2000° F., and for a time of from about 2 hours to about 12 hours, to deposit an aluminum-containing coating on the internal surface of the internal cavity. The aluminiding source powder is thereafter removed from the internal cavity through the inlet.

16 Claims, 3 Drawing Sheets

DIMENSIONALLY CONTROLLED PACK ALUMINIDING OF INTERNAL SURFACES OF A HOLLOW ARTICLE

This invention relates to coating the internal surfaces of a hollow gas turbine component such as a hollow gas turbine blade and, more particularly, to aluminiding the internal surfaces using a pack process to achieve a precisely controlled coating thickness.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forward.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the hot-section components of the engine. These components include the turbine vanes and turbine blades of the gas turbine, upon which the hot combustion gases directly impinge, and other hot-section components as well. In current engines, the turbine vanes and blades are made of nickel-based superalloys, and can operate at temperatures of up to about 2150° F. These components are also subject to damage by oxidation and corrosive agents, as well as impact damage and erosion by particles entrained in the combustion gas stream.

Many approaches have been used to increase the operating temperature limits and service lives of the hot-section components such as the turbine blades and vanes to their current levels, while achieving acceptable oxidation, corrosion, erosion, and impact resistance. The composition and processing of the base materials themselves have been improved. Portions of the external surfaces of the turbine blades and vanes are coated with a protective aluminide environmental coating and, in some cases, an insulating thermal barrier coating is applied overlying the aluminide coating.

Physical cooling techniques are also used. In one practice, the component is provided with an internal cooling cavity. Compressor bleed air flows into the internal cooling cavity through an inlet in the root of the component, and out of the internal cooling cavity through small-diameter outlets, such as found at the leading edge, trailing edge, and faces of the turbine blade. The air flow carries heat away from the cooled component and also provides film cooling. This physical cooling technique has allowed the hot-section components to run even hotter than possible for uncooled components.

As the operating temperatures have been pushed even further upwardly, it has been found that the internal surfaces of the internal cooling cavities experience oxidation and other degradation during service, particularly near the tip of the turbine blade. Therefore, more recently internal coatings have been applied to protect the internal surfaces of the hollow components.

However, the application of coatings to the internal surfaces poses some problems not found for external coatings, particularly because of the presence of the small-diameter outlets. Existing external coating techniques, when applied to internal coating, and candidate internal coating techniques are not sufficient to achieve the necessary internal coatings.

There is a need for an improved approach to coating internal surfaces of hollow articles having small-diameter outlets. The present invention fulfills this need, and further provides related advantages.

SUMMARY OF THE INVENTION

The present invention provides a method for aluminiding an internal surface of an internal cavity. The technique uses a pack aluminiding process to achieve a precisely controlled aluminide coating which is not so thick as to substantially impede airflow from the small-diameter outlets and not so thick as to promote low cycle fatigue cracking in the shank portion of the internal surface. The aluminiding source powder is selected so that the thickness of the coating is limited to the desired range of less than about 0.002 inch. The powder selection also ensures that the aluminiding source powder may be readily introduced into the internal cavity and also may be readily removed after the coating process is complete.

A method for aluminiding an internal surface of an internal cavity comprises the steps of providing an article having the internal cavity therein, wherein the internal cavity includes an inlet having an inlet minimum transverse dimension, and an outlet having an outlet minimum transverse dimension smaller than the inlet minimum transverse dimension. In a case of interest, the article is a component of a gas turbine engine such as a hollow gas turbine blade. The inlet is of relatively large size, while the outlet cooling holes are typically from about 0.009 to about 0.012 inch in diameter.

An aluminiding source powder having a minimum particle size of greater than about 0.0015 inch and not greater than about 60 percent of the outlet minimum transverse dimension is provided. In the case of most interest where the outlet minimum transverse dimension is from about 0.009 inch to about 0.012 inch, the aluminum source powder has a particle size of from about 0.0015 inch to about 0.005 inch. Most preferably, where the article has the outlet minimum transverse dimension of about 0.010 inch, the aluminum source powder has a particle size of from about 0.0025 inch to about 0.005 inch.

The aluminiding source powder is desirably a mixture of a metallic aluminum-containing powder and a ceramic powder. The metallic aluminum-containing powder is preferably a chromium-aluminum powder, and the ceramic powder is preferably aluminum oxide. The aluminiding source powder is a mixture of from about 5 to about 15 percent by weight of the metallic aluminum-containing powder and from about 85 to about 95 percent by weight of the ceramic powder. Most preferably, the aluminiding source powder has from about 6 to about 9 percent by weight of the metallic aluminum-containing powder and from about 91 to about 94 percent by weight of the ceramic powder.

The aluminiding source powder is introduced into the internal cavity through the inlet. The article with the aluminiding source powder in the internal cavity is heated to cause aluminum to transport from the aluminiding source powder to the internal surface of the internal cavity. The heating is preferably to a temperature of from about 1750° F. to about 2000° F., and for a time of from about 2 hours to about 12 hours.

The remaining aluminiding source powder is thereafter removed from the internal cavity through the inlet.

In another embodiment, a method for aluminiding an internal surface of an internal cavity comprises the steps of providing an article having the internal cavity therein and an inlet to the internal cavity, providing an aluminiding source powder as a mixture of from about 5 to about 15 percent (most preferably about 7.5 percent) by weight of a metallic aluminum-containing powder and from about 85 to about 95 percent by weight of a ceramic powder, introducing the aluminiding source powder into the internal cavity through the inlet, heating the article with the aluminiding source powder in the internal cavity to cause aluminum to transport from the aluminiding source powder to the internal surface of the internal cavity, and for a sufficient time to produce an aluminide coating on the internal surface having a thickness of less than about 0.002 inch, and thereafter removing the aluminiding source powder from the internal cavity through the inlet. Features discussed elsewhere herein may be used with this embodiment, to the extent that they are not incompatible.

The present approach achieves aluminide coating of the internal surfaces to a precisely limited and controlled thickness of less than about 0.002 inches. Thicker coatings tend to reduce the minimum dimension of the outlet cooling holes by an unacceptably large amount, adversely affecting the in-service performance of the article. Thicker coatings also promote low cycle fatigue failure in the shank portion of the turbine blade. Conventional vapor phase aluminiding processes such as chemical vapor deposition processes deposited overly thick coatings in the interior of the shank portion of the turbine blade and in the bores of the outlet cooling holes, thereby reducing the effective flow diameter of the holes and thence the cooling performance of the air flow. The pack aluminiding technique, particularly when used with the preferred mix of aluminum-containing and ceramic powders, permitted the coating to be controllably applied in the desired thickness range. Additionally, chemical vapor deposition sometimes penetrates through masks to deposit on unintended regions of the article, which does not occur with the present internal pack aluminiding approach.

When the pack aluminiding process is used, it is necessary to introduce the aluminiding source powder into the internal cavity. When the powder particles are too small, they tend to clump together and cannot be readily introduced through the inlet. When the powder particles are too large, they tend to become entrapped in the outlet holes and cannot be readily removed at the completion of the aluminiding process.

The present approach thus provides a powder-based aluminiding technique for internal cavities. The powder may be readily introduced and later removed from the internal cavity, and does not become entrapped in the outlet cooling holes. The use of the powder technique, with the correct powder size range and the correct proportions of powder, achieves controllable internal aluminide coating of the proper thickness in all regions.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
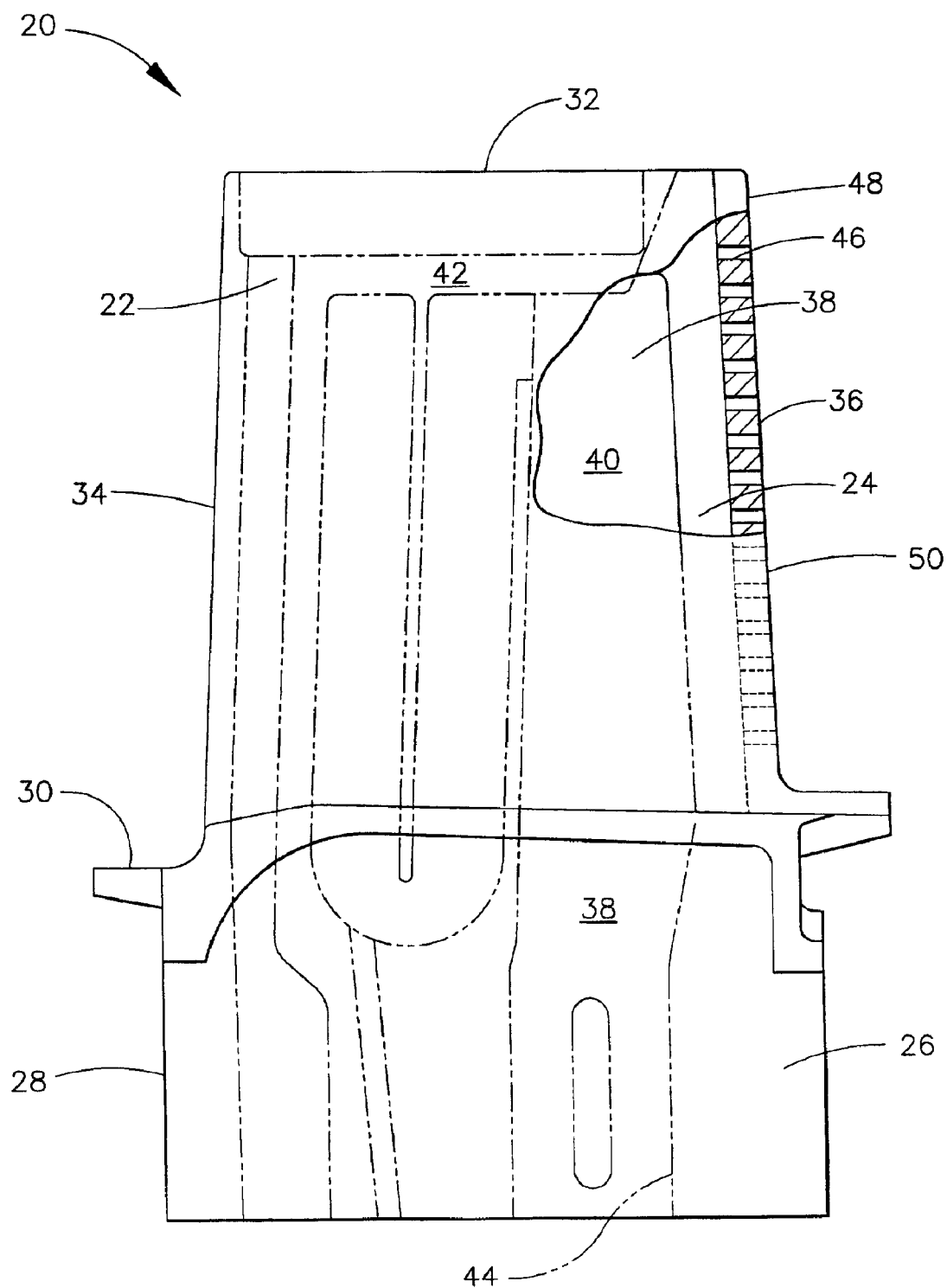
FIG. 1 is a schematic phantom view of a hollow gas turbine blade.

FIG. 1 depicts a hollow component 20 of a gas turbine engine, in this case a hollow gas turbine blade 22, with interior structure shown in phantom view. The gas turbine blade 22 is preferably formed of a nickel-base superalloy. The turbine blade 20 includes an airfoil 24 against which the flow of hot exhaust gas is directed. The turbine blade 20 is mounted to a turbine disk (not shown) by a dovetail shape 26 in a shank 28 of the gas turbine blade 22, which extends downwardly from the airfoil 24. The dovetail shape 26 engages a slot on the turbine disk (not shown) to mount the gas turbine blade 22 to the turbine disk. A platform 30 extends laterally outwardly from the area where the airfoil 24 is continuous with the shank 28. The gas turbine blade 22 may be described as having a tip end 32 opposite from the shank 28, a leading edge 34 that is first contacted by the hot exhaust gas, and a trailing edge 36.

As may be seen in the phantom view of FIG. 1, one or more internal cavities 38 having internal surfaces 40 are within an interior 42 of the gas turbine blade 22. The cavity 38 has an inlet 44, and one or more outlets 46 extend from the internal cavity 38 to an external surface 48 of the airfoil 24. In the illustration, the outlets 46 are to the trailing edge 36 of the airfoil 24. The outlets 46 are preferably in the form of fine channels or tubes extending from the internal cavity 38 to the external surface 48 through a wall 50 between the external surface 48 and the internal surface 40. In service, a flow of compressed cooling air is directed through the inlet 44, into the internal cavity 38, and out through the outlet 46. This flow of compressed cooling air through the internal cavity 38 and the outlet 46 conducts heat away from the hollow gas turbine blade 22, to reduce the temperature of the gas turbine blade 22.

In earlier generations of hollow gas turbine blades, the flow of cooling air kept the internal surfaces 40 at a sufficiently low temperature to prevent the growth of unacceptably thick oxidation or corrosion layers on the internal surfaces 40 of the internal cavities 38. More recently, the operating temperatures of the gas turbine engines have increased so that, despite the flow of cooling air, the internal surfaces 40 become so hot that they experience unacceptable oxidation and corrosion.

It has therefore become necessary to coat the internal surfaces 40 to prevent such environmental degradation. The usual approach has been to deposit an aluminum-containing coating onto the internal surfaces 40 using a vapor phase technique such as vapor phase aluminiding or chemical vapor deposition, in which aluminum-containing vapor is passed through the internal cavities 38 so that aluminum deposits onto the internal surfaces 40 and diffuses into the wall 50.

Such vapor phase techniques work well in many cases, but in others they deposit such a thick aluminide coating that the outlets 46 are partially blocked and their cross sectional air-flow passage is reduced in size. The result is a loss in cooling efficiency. This problems arises primarily when the absolute physical size of the outlets 46 is small, as is usually the case when the entire gas turbine blade 22 is relatively small.

Figure 2:
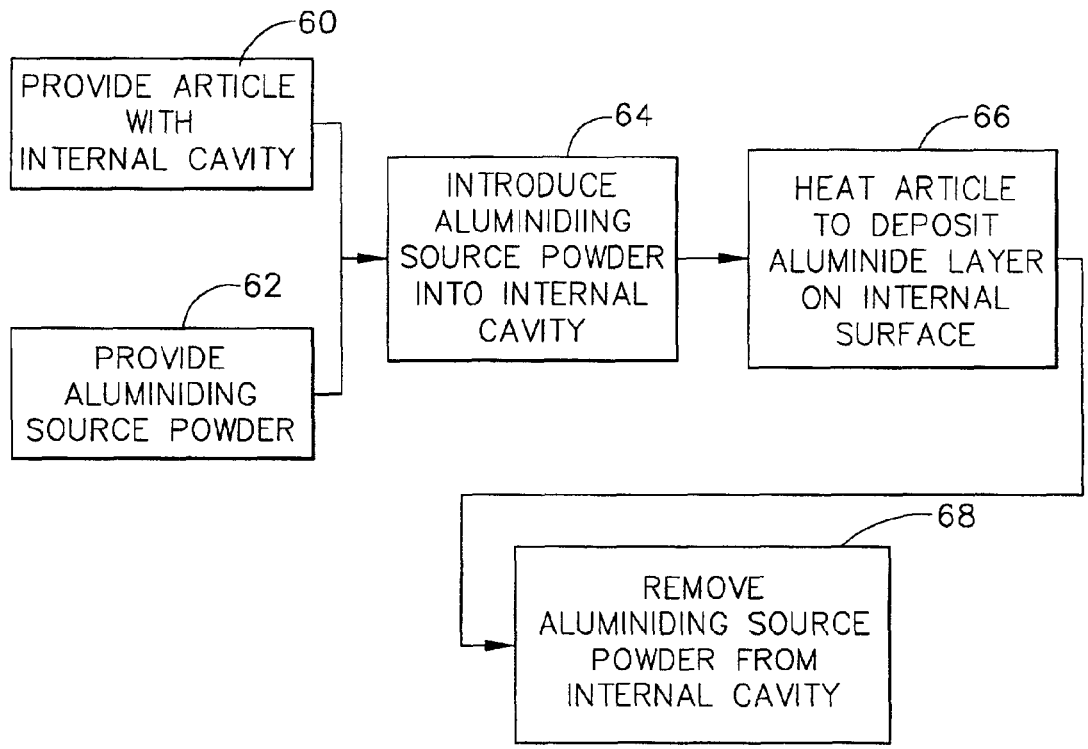
FIG. 2 is a block flow diagram of an approach for internal aluminiding of the gas turbine blade.

FIG. 2 illustrates in block diagram form an approach for practicing the invention. An article such as the hollow gas turbine blade 22 with its internal cavity 38 therein is provided, step 60. The article may be of any operable type, but is preferably a component of a gas turbine engine such as the hollow gas turbine blade 22 or another component that is cooled with an internal flow of cooling air such as a stationary shroud or a nozzle. The article is preferably made of a nickel-base superalloy. A nickel-base alloy has more nickel than any other element. A nickel-base superalloy is strengthened by the precipitation of gamma prime phase or a related phase. Examples of operable nickel-base superalloys are Rene™ 108, having a nominal composition, in weight percent, of about 9.4 percent cobalt, about 8.2 percent chromium, about 0.5 percent molybdenum, about 9.5 percent tungsten, about 3.2 percent tantalum, about 5.6 percent aluminum, about 0.7 percent titanium, about 1.5 percent hafnium, about 0.1 percent carbon, about 0.015 percent boron, balance nickel and impurities; Rene™ 142, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements; Rene™ N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; Rene™ N6, having a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; and MX-4, having a nominal composition in weight percent of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities.

The article such as the hollow gas turbine blade 22 has the internal cavity 38 with the inlet 44 having an inlet minimum transverse dimension, and the outlet 46 having an outlet minimum transverse dimension smaller than the inlet minimum transverse dimension. In a preferred case of interest, the outlet minimum transverse dimension is from about 0.009 inch to about 0.012 inch, and is most preferably about 0.010 inch. In the cases of most interest, the outlet 46 is generally cylindrical, and its minimum and maximum transverse dimensions are about the same. If the outlet has different minimum and maximum transverse dimensions, it is the minimum transverse dimension that is utilized here.

An aluminiding source powder is provided, step 62. Preferably, the aluminiding source powder has a minimum particle size of greater than about 0.0015 inch and not greater than about 60 percent of the outlet minimum transverse dimension. Where the article has the outlet minimum transverse dimension of from about 0.009 inch to about 0.012 inch, the aluminum source powder desirably has a particle size of from about 0.0015 inch to about 0.006 inch, but not greater than about 60 percent of the outlet minimum transverse dimension. Most preferably, the aluminum source powder has a particle size of from about 0.0025 inch to about 0.005 inch.

The size of the aluminum source powder is selected to permit the filling of the powder into the internal cavity 38, the aluminiding reaction, and the removal of the powder from the internal cavity 38. If the powder size is too small, the powder tends to clump and will not flow through the inlet 44 and into the internal cavity 38. If the powder size is too large, the powder particles tend to entrap in and plug the outlets 46, and cannot be removed when the aluminiding processing is completed. The present approach is to be contrasted with that of conventional pack aluminiding, wherein the aluminum source powder is typically about 0.007 inch or larger in size.

Figure 3:
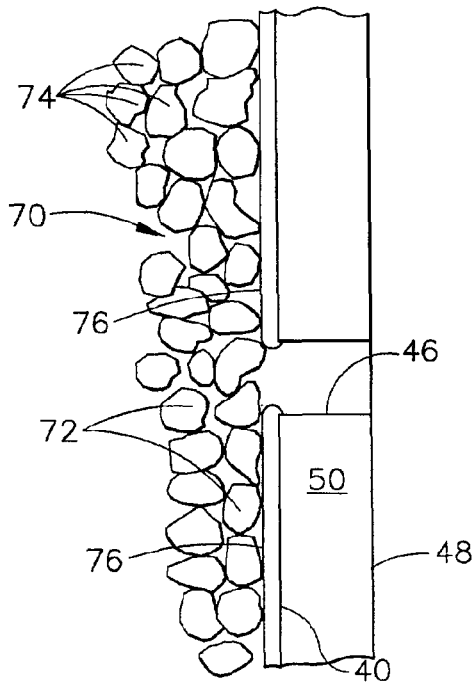
FIG. 3 is a fragmentary sectional view through the gas turbine blade of FIG. 1, taken in the plane of FIG. 1, but with the aluminiding source powder in place.

The aluminiding source powder 70 is preferably provided as a mixture of a metallic aluminum-containing powder 72 and a ceramic powder 74, as seen in FIG. 3. The metallic aluminum-containing powder 72 is preferably of a chromium-aluminum composition, most preferably of about 44 percent by weight chromium, balance aluminum and minor amounts of other elements. The ceramic powder 74 is preferably aluminum oxide (alumina, or $Al_2O_3$). (Aluminum oxide powder contains aluminum, but the aluminum oxide powder is not metallic in form.) It is preferred that the aluminiding source powder not contain a halide activator, so that the aluminiding process is by powder-to-metal wall diffusion rather than vapor deposition.

The aluminiding source powder 70 is provided as a mixture of from about 5 to about 15 percent by weight of the metallic aluminum-containing powder 72, which is preferably the chromium-aluminum powder, and from about 85 to about 95 percent by weight of the ceramic powder 74. More preferably, the aluminiding source powder 70 has from about 6 to about 9 percent by weight of the metallic aluminum-containing powder 72 and from about 91 to about 94 percent by weight of the ceramic powder 74. Most preferably, the aluminiding source powder 70 has about 7.5 percent by weight of the metallic aluminum-containing powder 72 and about 92.5 percent by weight of the ceramic powder 74.

External pack aluminiding source powders normally contain about ⅓ by weight of aluminum-containing powder and about ⅔ by weight ceramic powder. Studies leading to the present invention demonstrated that this high a fraction of the aluminum-containing powder leads to too thick an aluminide coating or layer 76. For the present internal aluminiding application, the aluminide layer 76 may not be more than about 0.002 inch thick, and preferably not more than about 0.0015 inch thick. If the aluminide layer 76 is thicker, there are two adverse effects. First, the overly thick aluminide layer 76 tends to reduce the flow-passage diameter of the outlet 46, so that the cooling functionality is partially lost because the outlet hole is partially blocked. Second, the overly thick aluminide layer deposited on the internal surface 49 in the region of the shank 28 tends to serve as an initiation site for low cycle fatigue failure. The aluminide layer 76 may not be less than about 0.0003 inch in the portion of the internal cavity 38 that is within the airfoil 24, or its protective function is compromised.

The aluminiding source powder 70 is introduced into the internal cavity 38 through the inlet 44, step 64 of FIG. 2. The article is inverted from the position shown in FIG. 1, with the inlet 44 facing upwardly, to accomplish the filling. Care is taken to fill the internal cavity 38 as fully as possible. The article may be shaken or vibrated to promote the complete filling.

The article with the aluminiding source powder 70 in the internal cavity 38 is heated to cause aluminum to transport from the aluminiding source powder 70 to the internal surface 40 of the internal cavity 38, step 66. Preferably, the step of heating the article is performed by heating the article to a temperature of from about 1750° F. to about 2000° F., and for a time of from about 2 hours to about 12 hours, in a non-oxidizing atmosphere such as argon, hydrogen, or helium.

The remaining aluminiding source powder 70 is removed from the internal cavity 38 through the inlet 44, step 68. This may be done by inverting the article and allow the loose aluminiding source powder 70 to flow out of the internal cavity 38 through the inlet 44. Any remaining aluminiding source powder may be removed from the internal cavity 38 with a water flush.

The present invention has been reduced to practice in a series of tests designed to validate the selection of powder sizes and powder mixes. The powder size studies showed that powder sizes of less than about 0.0015 inches clumped in the inlet over a range of inlet sizes, and smooth filling of the internal cavity was not achieved. For outlets of about 0.010 inches, powder sizes of greater than about 0.006 inches tended to plug the outlets during the aluminiding process and could not be readily removed. The preferred powder size for outlets of about 0.010 inches was about 0.0015–0.005 inches.

Turbine blades with an inlet size of about 0.030–0.040 inch by about 0.250 inch and an outlet size of about 0.010 inch were aluminided with the same aluminiding conditions. The percentages of the Cr—Al powder ranged from 5 percent to 15 percent of the powder mix by weight, and with the remainder of the powder mix being aluminum oxide powder. The following table illustrates the results:

| percent Cr—Al | No of blades | airfoil internal cavity aluminide thickness, mils | shank internal cavity aluminide thickness, mils |
|---|---|---|---|
| 5 | 10 | 0.6 | 0.3 |
| 7.5 | 10 | 0.8 | 0.3 |
| 10 | 10 | 0.8 | 0.6 |
| 15 | 4 | 1.1 | 1.1 |

For comparison, a typical external aluminiding mix with 33 percent Cr—Al powder produces an aluminide coating thickness of greater than 2 mils (1 mil=0.001 inch) in the same processing.

From these data, it was determined that an acceptable range was 5–15 percent Cr—Al powder in the aluminiding source powder, more preferably from about 6–9 percent, and that 7.5 percent is most preferred.

Figure 4:
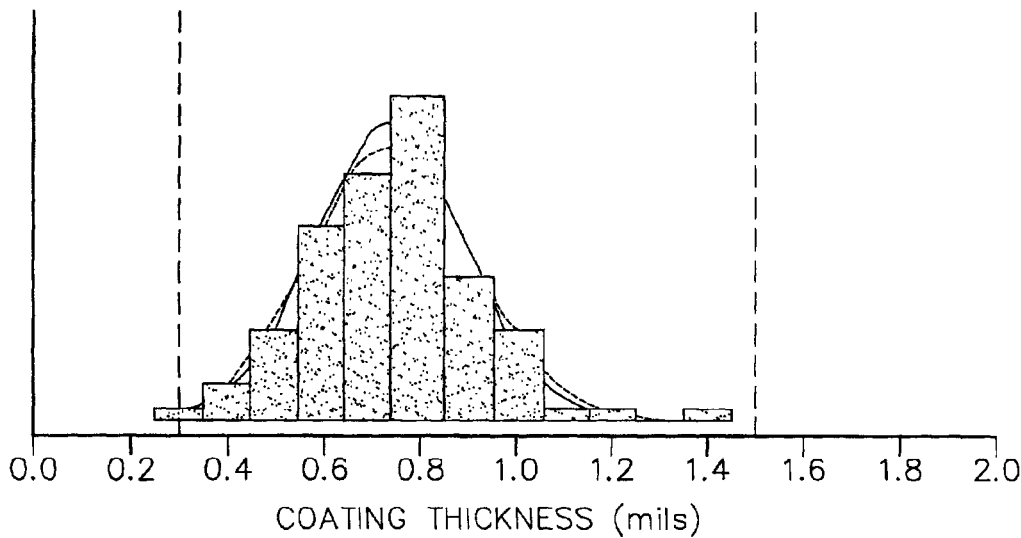
FIG. 4 is a relative frequency graph of coating thicknesses within the interior cavity.
Figure 5:
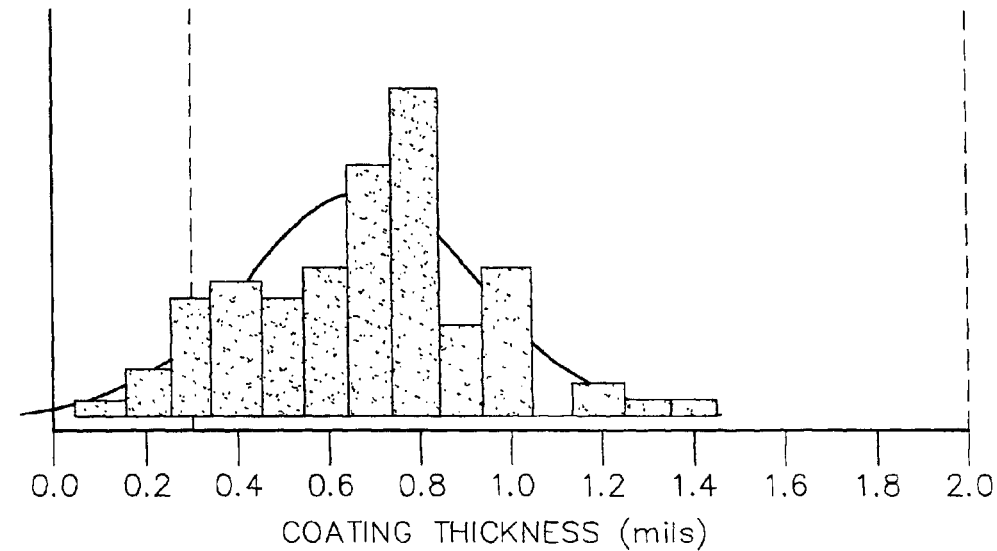
FIG. 5 is a relative frequency graph of coating thickness within the shank portion of the turbine blade.

A series of tests were performed for the most preferred Cr—Al powder percentage of 7.5 percent, and the results are shown in FIGS. 4–5 as relative frequency plots of the number of measurements of a thickness as a function of the thickness of the aluminide coating for the interior surface of the wall of the internal cavity and for the interior surface of the shank portion, respectively. All of the measurements are within the range of 0.0003 to 0.0015 inch for the interior wall of the internal cavity and are less than 0.002 inch for the interior wall of the shank portion, as desired.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for aluminiding an internal surface of an internal cavity, comprising the steps of
   providing an article having the internal cavity therein, wherein the internal cavity includes
      an inlet having an inlet minimum transverse dimension, and
      an outlet having an outlet minimum transverse dimension smaller than the inlet minimum transverse dimension;
   providing an aluminiding source powder having a minimum particle size of greater than about 0.0015 inch and not greater than about 60 percent of the outlet minimum transverse dimension;
   introducing the aluminiding source powder into the internal cavity through the inlet;
   heating the article with the aluminiding source powder in the internal cavity to cause aluminum to transport from the aluminiding source powder to the internal surface of the internal cavity; and thereafter
   removing the aluminiding source powder from the internal cavity through the inlet.

2. The method of claim 1, wherein the step of providing the article includes the step of
   providing a hollow component of a gas turbine engine.

3. The method of claim 1, wherein the step of providing the article includes the step of
   providing a hollow gas turbine blade.

4. The method of claim 1, wherein the step of providing the article includes the step of
   providing the article having the outlet minimum transverse dimension of from about 0.009 inch to about 0.0 12 inch, and wherein the step of providing the aluminiding source powder includes the step of
   providing the aluminiding source powder having a particle size of from about 0,0015 inch to about 0.005 inch.

5. The method of claim 1, wherein the step of providing the article includes the step of
   providing the article having the outlet minimum transverse dimension of about 0.010 inch, and wherein the step of providing the aluminiding source powder includes the step of
   providing the aluminiding source powder having a particle size of from about 0.0025 inch to about 0.005 inch.

6. The method of claim 1, wherein the step of introducing includes the step of
   providing the aluminiding source powder as a mixture of a metallic aluminum-containing powder and a ceramic powder.

7. The method of claim 1, wherein the step of introducing includes the step of
   providing the aluminiding source powder as a mixture of from about 5 to about 15 percent by weight of a metallic aluminum-containing powder and from about 85 to about 95 percent by weight of a ceramic powder.

8. The method of claim 1, wherein the step of introducing includes the step of
provide the aluminiding source powder having from about 6 to about 9 percent by weight of a metallic chromium-aluminum powder and from about 94 to about 91 percent by weight of an aluminum oxide powder.

9. The method of claim 1, wherein the step of heating the article includes the step of
heating the article to a temperature of from about 1750° F. to about 2000° F., and for a time of from about 2 hours to about 12 hours.

10. A method for aluminiding an internal surface of an internal cavity, comprising the steps of
providing an article having the internal cavity therein and an inlet to the internal cavity, and an outlet from the internal cavity having an outlet minimum transverse dimension of from about 0.0009 inch to about 0.012 inch;
providing an aluminiding source powder having a minimum particle size greater than about 0.0015 inch and not greater than about 60 percent of the outlet minimum transverse dimension as a mixture of from about 5 to about 15 percent by weight of a metallic aluminum-containing powder and from about 85 to about 95 percent by weight of a ceramic powder;
introducing the aluminiding source powder into the internal cavity through the inlet;
heating the article with the aluminiding source powder in the internal cavity to cause aluminum to transport from the aluminiding source powder to the internal surface of the internal cavity, and for a sufficient time to produce an aluminide coating on the internal surface having a thickness of less than about 0.002 inch; and thereafter
removing the aluminiding source powder from the internal cavity through the inlet.

11. The method of claim 10, wherein the step of providing the article includes the step of
providing a hollow component of a gas turbine engine.

12. The method of claim 10, wherein the step of providing the article includes the step of
providing a hollow gas turbine blade.

13. The method of claim 10, wherein the step of providing the aluminiding source powder includes the step of
providing the aluminiding source powder having from about 6 to about 9 percent by weight of the metallic aluminum-containing powder and from about 91 to about 94 percent by weight of the ceramic powder.

14. The method of claim 10, wherein the step of introducing includes the step of
providing the aluminiding source powder as a mixture of from about 5 to about 15 percent by weight of a metallic chromium-aluminum powder and from about 85 to about 95 percent by weight of an aluminum oxide powder.

15. The method of claim 10, wherein the step of heating the article includes the step of
heating the article to a temperature of from about 1750° F. to about 2000° F., and for a time of from about 2 hours to about 12 hours.

16. A method for aluminiding an internal surface of an internal cavity, comprising the steps of
providing a hollow gas turbine blade having the internal cavity therein, wherein the internal cavity includes
an inlet having an inlet minimum transverse dimension, and
a set of trailing edge cooling outlets, each trailing edge cooling outlet having an outlet minimum transverse dimension smaller than the inlet minimum transverse dimension, wherein the outlet minimum transverse dimension is from about 0.009 inch to about 0.012 inch;
providing an aluminiding source powder having a minimum particle size of greater than about 0.0015 inch and not greater than about 0.005 inch, and wherein the aluminiding source powder comprises a mixture of from about 5 to about 15 percent by weight of a metallic aluminum-containing powder and from about 85 to about 95 percent by weight of a ceramic powder, to deposit an aluminum-containing coating on the internal surface of the internal cavity;
introducing the aluminiding source powder into the internal cavity through the inlet;
heating the article to a temperature of from about 1750° F. to about 2000° F., and for a time of from about 2 hours to about 12 hours; and thereafter
removing the aluminiding source powder from the internal cavity through the inlet.

* * * * *

UNITED STATES PATENT AND TRADEMARK OFFICE
CERTIFICATE OF CORRECTION

| | |
|---|---|
| PATENT NO. | : 7,094,445 B2 |
| APPLICATION NO. | : 10/140852 |
| DATED | : August 22, 2006 |
| INVENTOR(S) | : Atul Natverlal Shah |

Page 1 of 1

It is certified that error appears in the above-identified patent and that said Letters Patent is hereby corrected as shown below:

On the Title page, item 56, References Cited, please add the following U.S. Patent Documents
-- 3,936,539 A, 2/1976, Baldi et al.
 4,332,843 A, 6/1982, Ahuja et al.
 5,464,699 A, 11/1995, Baldi et al. --, On the Title page, item 56, References Cited, please add the following Foreign Patent Document
-- EP 1 144 708 A, 10/2001, Mtu Aero Engines GMBH --, In column 2, line 42 "mini mum" should be -- minimum --.

Signed and Sealed this

Ninth Day of January, 2007

JON W. DUDAS
*Director of the United States Patent and Trademark Office*